United States Patent
Simanjuntak et al.

(10) Patent No.: US 12,013,870 B2
(45) Date of Patent: Jun. 18, 2024

(54) DISTRIBUTION OF WORKLOADS AMONG ONLINE ANALYTICS PROCESSING SYSTEMS

(71) Applicant: INTERNATIONAL BUSINESS MACHINES CORPORATION, Armonk, NY (US)

(72) Inventors: Manogari Nogi Simanjuntak, San Jose, CA (US); Sowmya Kameswaran, San Jose, CA (US); Daniel Martin, Leinfelden-Echterdingen (DE); Jia Heng Zhong, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 17/816,089

(22) Filed: Jul. 29, 2022

(65) Prior Publication Data
US 2024/0037115 A1    Feb. 1, 2024

(51) Int. Cl.
*G06F 16/25* (2019.01)
*G06F 16/245* (2019.01)
*G06F 16/27* (2019.01)

(52) U.S. Cl.
CPC .......... *G06F 16/254* (2019.01); *G06F 16/245* (2019.01); *G06F 16/27* (2019.01)

(58) Field of Classification Search
CPC ....... G06F 16/254; G06F 16/245; G06F 16/27
See application file for complete search history.

(56) References Cited

U.S. PATENT DOCUMENTS

| | | | |
|---|---|---|---|
| 5,799,173 A | 8/1998 | Gossler | |
| 9,489,222 B2 | 11/2016 | Zlotkin | |
| 10,282,363 B2 | 5/2019 | Hrle | |
| 10,754,874 B2 | 8/2020 | Hrle | |
| 10,762,108 B2 | 9/2020 | Hrle | |
| 11,138,227 B2 | 10/2021 | Brodt | |
| 2007/0198986 A1* | 8/2007 | Panziera | G06F 9/5066 718/105 |
| 2009/0248631 A1* | 10/2009 | Alba | G06F 16/2457 707/615 |

(Continued)

FOREIGN PATENT DOCUMENTS

WO    2014122555 A1    8/2014

OTHER PUBLICATIONS

Disclosed Anonymously, "Multi-Cache Architecture for Data Replication System", An IP.com Prior Art Database Technical Disclosure, IP.com No. IPCOM000264347D, Dec. 4, 2020, 4 pgs.

(Continued)

*Primary Examiner* — Yuk Ting Choi
(74) *Attorney, Agent, or Firm* — James Olsen (57) ABSTRACT

Technology for routing queries in a system with a plurality of nodes (for example online analytical processing subsystems) where each node has an associated replicated local database and a local latency value and replication velocity values. The workload balancing for incoming received queries among and between the plurality of nodes is based, at least in part, on consideration of latency values and/or replication velocity values for the various nodes. The best node to handle a given query is thereby selected and the query is routed to the selected node for response.

1 Claim, 5 Drawing Sheets

(56) References Cited

U.S. PATENT DOCUMENTS

| | | | | |
|---|---|---|---|---|
| 2013/0318221 | A1* | 11/2013 | Anaya | H04L 47/70 709/223 |
| 2016/0110439 | A1 | 4/2016 | Hrle | |
| 2016/0171070 | A1* | 6/2016 | Hrle | G06F 16/2379 707/615 |
| 2018/0307728 | A1* | 10/2018 | Crupi | G06F 16/24549 707/615 |
| 2019/0057126 | A1 | 2/2019 | Beier | |
| 2019/0294614 | A1 | 9/2019 | Brodt | |
| 2020/0151195 | A1 | 5/2020 | Brodt | |
| 2021/0011647 | A1* | 1/2021 | Coleman | G06F 3/0647 707/615 |

OTHER PUBLICATIONS

Disclosed Anonymously, "Online Database Recovery in Database Accelerator Environments", An IP.com Prior Art Database Technical Disclosure, IP.com No. IPCOM000268044D, Dec. 17, 2021, 4 pgs.

Disclosed Anonymously, "System and Method to Efficiently Query Data in Distributed Environment Using Multi-Dimension Data Replica", An IP.com Prior Art Database Technical Disclosure, IP.com No. IPCOM000209140D, Jul. 29, 2011, 10 pgs.

Martin, et al., "Stale Data Recognition", U.S. Appl. No. 17/476,039, filed Sep. 15, 2021, 41 pgs.

Ramnarayan, et al., "SnappyData: A Hybrid Transactional Analytical Store Built on Spark", SIGMOD '16: Proceedings of the 2016 International Conference on Management of Data, San Francisco, CA, USA, Jun. 2016, 4 pgs., DOI: http://dx.doi.org/10.1145/2882903.2899408.

Rosselli, et al., "Benchmarking the Availability and Fault Tolerance of Cassandra", Conference: Workshop on Big Data Benchmarks, Dec. 2016, 10 pgs., DOI:10.1007/978-3-319-49748-8_5.

Stonebraker, et al., "Enterprise Database Applications and the Cloud: A Difficult Road Ahead", 2014 IEEE International Conference on Cloud Engineering, Mar. 11, 2014, 6 pgs., DOI:10.1109/IC2E.2014.97.

* cited by examiner

DISTRIBUTION OF WORKLOADS AMONG ONLINE ANALYTICS PROCESSING SYSTEMS

BACKGROUND

The present invention relates generally to online transaction processing systems (OLTPs) and online analytics processing systems (OLAPs). An OLTP is a database management system (DMBS) designed for transaction processing (sometimes also referred to as "operational processing"). An OLAP is a DMBS designed for analytics processing.

The Wikipedia entry for "database" (as of 10 Apr. 2022) states, in part, as follows: "A database management system (DBMS) is the software that interacts with end users, applications, and the database itself to capture and analyze the data. The DBMS software additionally encompasses the core facilities provided to administer the database. The sum total of the database, the DBMS and the associated applications can be referred to as a database system. Often the term 'database' is also used loosely to refer to any of the DBMS, the database system or an application associated with the database." In this document, "database" shall refer to the substantive data stored in the database and should not be confused with the DBMS (OLAP or OLTP) that controls and manages its respective associated database."

The Wikipedia entry for "online transaction processing" (as of 1 Apr. 2022) states, in part, as follows: "In online transaction processing (OLTP), information systems typically facilitate and manage transaction-oriented applications. The term 'transaction' can have two different meanings, both of which might apply: in the realm of computers or database transactions it denotes an atomic change of state, whereas in the realm of business or finance, the term typically denotes an exchange of economic entities (as used by, e.g., Transaction Processing Performance Council or commercial transactions. OLTP may use transactions of the first type to record transactions of the second. OLTP has also been used to refer to processing in which the system responds immediately to user requests. An automated teller machine (ATM) for a bank is an example of a commercial transaction processing application. Online transaction processing applications have high throughput and are insert- or update-intensive in database management. These applications are used concurrently by hundreds of users. The key goals of OLTP applications are availability, speed, concurrency and recoverability. Reduced paper trails and the faster, more accurate forecast for revenues and expenses are both examples of how OLTP makes things simpler for businesses . . . . Whereas OLTP systems process all kinds of queries (read, insert, update and delete), OLAP is generally optimized for read only and might not even support other kinds of queries. OLTP also operates differently from batch processing and grid computing." (footnotes omitted)

The Wikipedia entry for "online analytics processing" (as of 1 Apr. 2022) states, in part, as follows: "Online analytical processing, or OLAP . . . is an approach to answer multi-dimensional analytical (MDA) queries swiftly in computing. OLAP is part of the broader category of business intelligence, which also encompasses relational databases, report writing and data mining. Typical applications of OLAP include business reporting for sales, marketing, management reporting, business process management (BPM), budgeting and forecasting, financial reporting and similar areas, with new applications emerging, such as agriculture. The term OLAP was created as a slight modification of the traditional database term online transaction processing (OLTP) . . . . Databases configured for OLAP use a multidimensional data model, allowing for complex analytical and ad hoc queries with a rapid execution time . . . . OLAP is typically contrasted to OLTP (online transaction processing), which is generally characterized by much less complex queries, in a larger volume, to process transactions rather than for the purpose of business intelligence or reporting. Whereas OLAP systems are mostly optimized for read, OLTP has to process all kinds of queries (read, insert, update and delete)." (footnotes omitted)

SUMMARY

According to an aspect of the present invention, there is a method, computer program product and/or system for distributing query response workload in an online processing system including a workload balance module and a plurality of online processing sub-systems and with each online processing subsystem respectively including a database management module, a replicated version of a database and a server configured to respond to queries that performs the following operations (not necessarily in the following order): (i) for each online processing sub-system of the plurality of online processing systems, receiving a current performance characteristics data set including at least: (a) an update latency value indicative of a latency time associated with the given online processing sub-system occurring during intermittent database replication updates, and (b) an update replication velocity value indicative of a speed at which the given online processing system receives data during intermittent database replication updates; (ii) receiving, by the workload balance module, a query requesting selected information from the database; and (iii) selecting, by machine logic of the workload balance module, a target online processing sub-system for responding to the query based on the current performance data sets of the plurality of online processing sub-systems, with the selection of the target online processing sub-system including consideration of at least the update latency values and the update replication velocity values.

According to a further aspect of the present invention, there is a method, computer program product and/or system for distributing query response workload in an online processing system including a workload balance module and a plurality of online processing sub-systems and with each online processing subsystem respectively including a database management module, a replicated version of a database and a server configured to respond to queries that performs the following operations (not necessarily in the following order): (i) for each online processing sub-system of the plurality of online processing systems, receiving a current performance characteristics data set including at least an update latency value indicative of a latency time associated with the given online processing sub-system occurring during intermittent database replication updates; (ii) receiving, by the workload balance module, a query requesting selected information from the database; and (iii) selecting, by machine logic of the workload balance module, a target online processing sub-system for responding to the query based on the current performance data sets of the plurality of online processing sub-systems, with the selection of the target online processing sub-system including consideration of at least the update latency values.

According to a further aspect of the present invention, there is a method, computer program product and/or system for distributing query response workload in an online processing system including a workload balance module and a plurality of online processing sub-systems and with each online processing subsystem respectively including a database management module, a replicated version of a database and a server configured to respond to queries that performs the following operations (not necessarily in the following order): (i) for each online processing sub-system of the plurality of online processing systems, receiving a current performance characteristics data set including at least an update replication velocity value indicative of a speed at which the given online processing system receives data during intermittent database replication updates; (ii) receiving, by the workload balance module, a query requesting selected information from the database; and (iii) selecting, by machine logic of the workload balance module, a target online processing sub-system for responding to the query based on the current performance data sets of the plurality of online processing sub-systems, with the selection of the target online processing sub-system including consideration of at least the update replication velocity values.

DETAILED DESCRIPTION

Some embodiments of the present invention are directed to distribution of a computing workload in an online processing system. In some embodiments, the method of distribution includes the following operations: (i) receiving data latency values for each of a plurality of target database management systems; (ii) identifying a first target database management system database management system (DBMS) having a smallest latency value; and (iii) routing a current query to the first target DBMS. Some embodiments also consider a factor called "replication velocity" for each of the target DMBSs when selecting the first target DBMS, and route a query to a target DMBS based, at least in part, on its replication velocity. As will be understood by those of skill in the art, the replication velocity is a measure of how much data can be transferred into or out of a given candidate target database by its associated target DMBS. For example, if 1000 rows are transferred from source to destination then 1000 rows/second is the replication velocity. If there is a 5 second lag in the transfer (destination gets it 5 seconds later than source has the updates) then 5 seconds is the replication latency. The latency varies over time and will not and need not remain constant.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
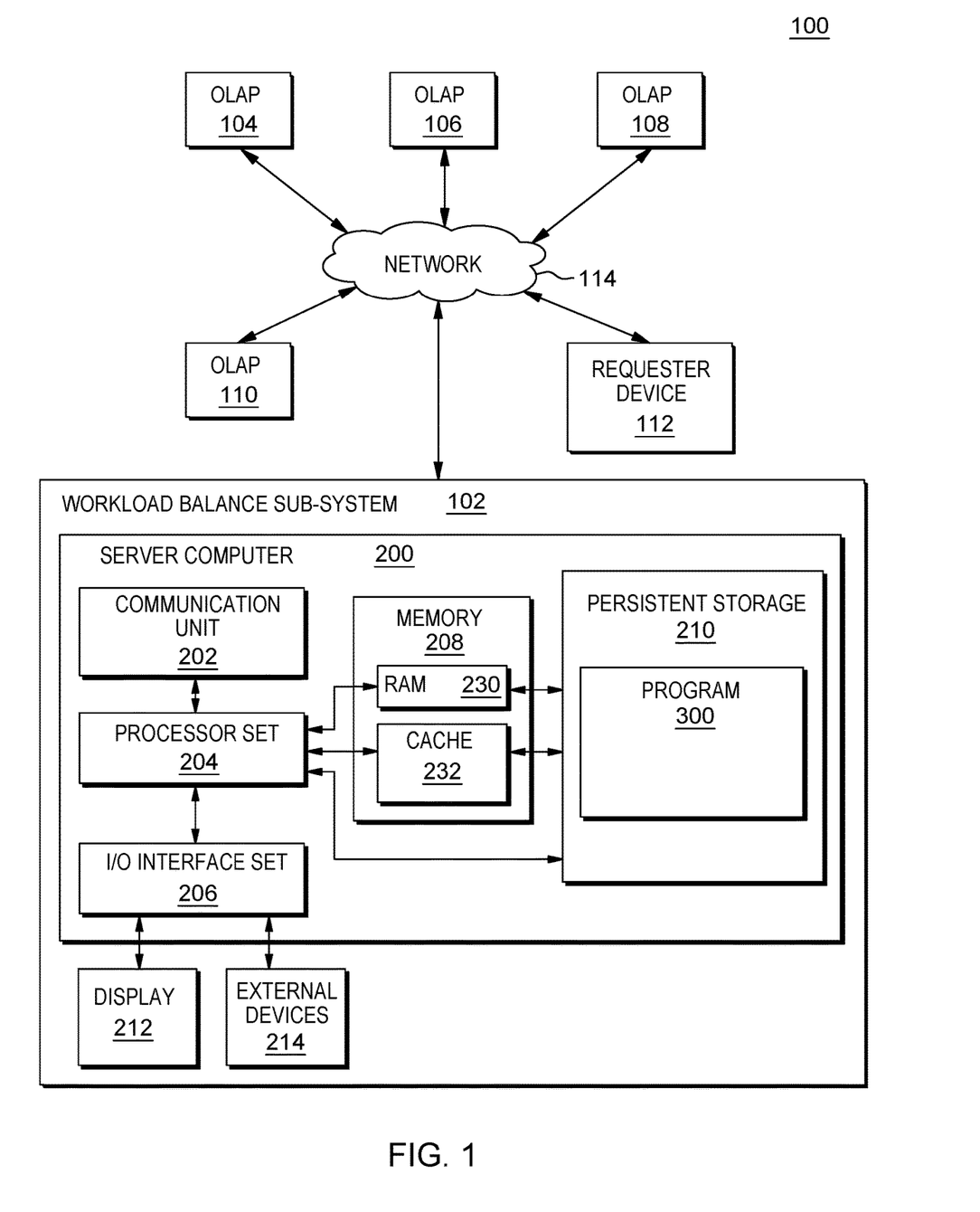
FIG. 1 is a block diagram of a first embodiment of a system according to the present invention.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
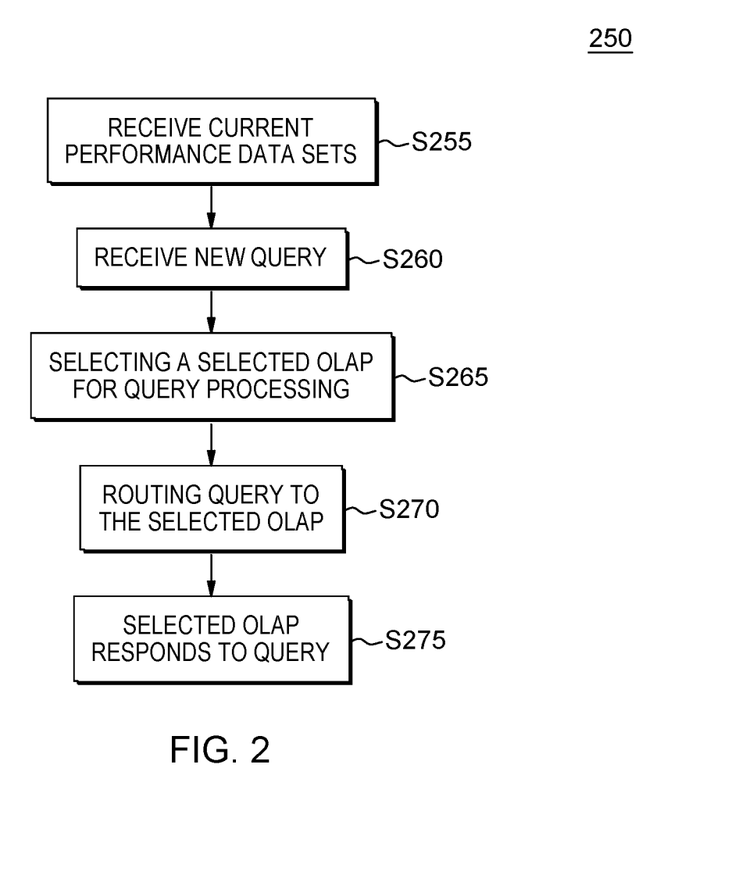
FIG. 2 is a flowchart showing a first embodiment method performed, at least in part, by the first embodiment system.
Figure 3:
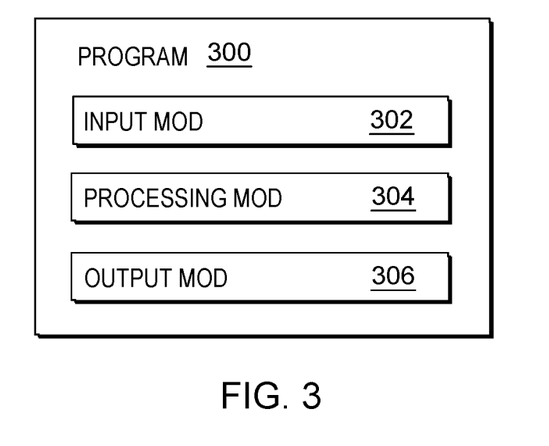
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Processing begins at operation S255, where input module ("mod") 302 receives a current performance characteristics data set for each online analytical processing (OLAP) subsystem 104, 106, 108, 110 that is in larger system 100. In this embodiment, each performance characteristics data set includes only: (i) an update latency value indicative of a latency time associated with the given online processing sub-system occurring during intermittent database replication updates, and (ii) an update replication velocity value indicative of a speed at which the given online processing system receives data during intermittent database replication updates. In some embodiments, as discussed in the next sub-section of this Detailed Description section, other performance characteristics of the various OLAP's are included in the performance characteristics data set.

Processing proceeds to operation S260, where input mod 302 receives a query requesting selected information from the database from a requester at requester device 112 through network 114.

Processing proceeds to operation S265, where processing mod 304 selects a target online processing sub-system for responding to the query based on the current performance data sets of the plurality of online processing sub-systems, with the selection of the target online processing sub-system including consideration of at least the update latency values and the update replication velocity values. There are many possible mathematical algorithms for selecting a target OLAP for responding to the query based (at least in part) on latency and/or replication velocity values. In this particular example, for each given OLAP: (i) an aggregate replication characteristic is computed by taking the replication latency value and subtracting the replication velocity value from it; and (ii) the OLAP with the lowest aggregate value is selected for responding to the new query. Alternatively, and as discussed in the next section, some embodiments set threshold values for latency and/or replication velocity to see which OLAPs qualify for consideration (for example, further consideration based on other performance characteristics).

Processing proceeds to operation S270, where output mod 306 routes the query to the target online processing subsystem. In this example, OLAP 108 has the lowest aggregate replication characteristic value, so the query from requester device 112 is routed to OLAP 108.

Processing proceeds to operation S275, where the server of OLAP 108 (not separately shown in FIG. 1) and the replicated database of the selected online processing system (not separately shown in FIG. 1) responds to the query. The data is likely to be as fresh as feasible because the latency and replication velocity of OLAP 108 were considered in selecting it to be the target, the query responder.

III. Further Comments and/or Embodiments

Modern applications require access to the most recent data irrespective of whether they provide support for operational (OLTP) or analytical (OLAP) business processes. Traditional database management systems (DBMS) cannot individually support this requirement because they are designed either for operational workloads or, alternatively, for analytical workloads. Therefore, in order to meet the an application's needs for performance of both operational and analytical workloads, at least one DBMS of each type is needed to be present in the larger computing environment. Because two or more DBMSs are involved in serving an application's requests, the problem of data coherency arises. Namely, the different DBMSs operate on their own copies of data and keeping these copies coherent (that is, in synchronization) is a technological challenge. Furthermore, enterprises typically manage a rapidly increasing volume of information for optimizing production and distribution processes, for evaluating compliance and customer satisfaction, and/or for managing staff-related data. Typically, many different systems are used for managing data, and the data is distributed over many different distributed sources. However, this can become an issue when a global/consolidated/holistic type of view on the available data is needed.

According to some prior art approaches, an accelerator is introduced to solve the need of combining the abilities of the OLTP system and the OLAP system, where data originates from a OLTP system and is asynchronously replicated to the accelerator (which is typically part of an OLAP system). This is done to ensure analytical business processes retrieve the most current data when responding to a query. In this setup, there is still a possibility that one or more business processes can run when data replication to the database that is managed and controlled by the OLAP is still underway and not completed. This results in the business process receiving stale data instead of current data. This can cause an issue when an application is expecting to receive current data and instead gets stale data due to the replication process that is ongoing while its query(ies) are being responded to.

Under other currently conventional technology, a WAITFORDATA special register is implemented. Through this register, users can control whether queries should operate on current (updated) data with the understanding that the need to base query responses on the most current data can increase elapsed time in waiting for query response(s). The WAITFORDATA technology involves calculation and reporting of an indicator that shows if the business process or application ran on current or stale data. By this indicator, applications that are sensitive to currency of the data can determine if they want to wait for replication to complete before execution. In addition to the indicator, the actual data staleness value is also reported. It is also known to associate a time out value, along with the WAITFORDATA register. A timeout defines a length of time that a given query will wait for relatively fresh data. If suitably current data cannot be obtained in response to the given query, then the query is responded to with a timeout error.

In a system where multiple OLAP and OLTP systems are collaborating, workload balancing becomes key. Many methods have been introduced to balance workload among eligible processing servers or nodes. Many of these methods rely on capacity (for example, processing capacity, storage capacity) and/or the number of service requests or request queue length for each processing server. Where a source OLTP DBMS is sending queries to multiple target OLAP DBMS s, workload balancing methods are utilized to efficiently distribute work (for example, where to route queries for response). In a vast majority of such cases, the capacity and configurations of the servers are not uniform and network configurations and topologies vary. The use of capacity and number of requests can be useful, but some embodiments of the present invention consider these factors in conjunction with latency values and/or replication velocity values when deciding to which server a given query should be routed. It is noted that a database server can be set up as multi node or single node. Some embodiments of the present invention work at a level where multiple servers are connected and control the process of routing to the best server. This can provide a transparent and efficient balance between the servers. What is meant by "transparent" here is that other servers are involved in the mix, and the identity of the particular server that gets the request is typically immaterial.

Some embodiments of the present invention use the reported data staleness information to enhance workload distribution in a hybrid data management system that is asynchronously replicated. This information is used by the source system when choosing the target system to execute a query that has been flagged in a WAITFORDATA register (or subject to a similar indicator that it is desired to use the most current data possible even if it takes longer to get a response to the query). In some embodiments, the larger system includes: (i) an OLTP system that acts as the source DBMS; and (ii) multiple OLAP systems that act as target DBMS systems. Data is replicated asynchronously from the source DBMS to the target DBMS and each update will be marked with a timestamp from the source DBMS. Therefore each target DBMS will have a timestamp from the source that indicate the latency and/or the degree of currency of the data. When a query is submitted through the source DBMS and forwarded to the target DBMS, a timestamp is included in the request. This timestamp indicates when the target tables were last updated on the source DBMS. During processing of this query in the target DBMS, the query timestamp is compared to the update timestamp of the target DBMS. If the query timestamp is the same or older than the update timestamp of the target DBMS, the resulting data is considered current. Otherwise, the result is considered stale as the target DBMS does not yet have all the updates from source DBMS relevant to the query.

Some embodiments take advantage of the data staleness from the target DBMS systems to better distribute the queries to the target system with least latency in order to make sure incoming queries are routed to the target system with most current data and reduce the chance of the query failures due to a WAITFORDATA time out. This staleness information, combined with asynchronous replication velocity (as further explained, below) also helps the source system to fail a WAITFORDATA query early when each and every target system's latency is greater than the specified WAITFORDATA time out threshold.

Figure 4:
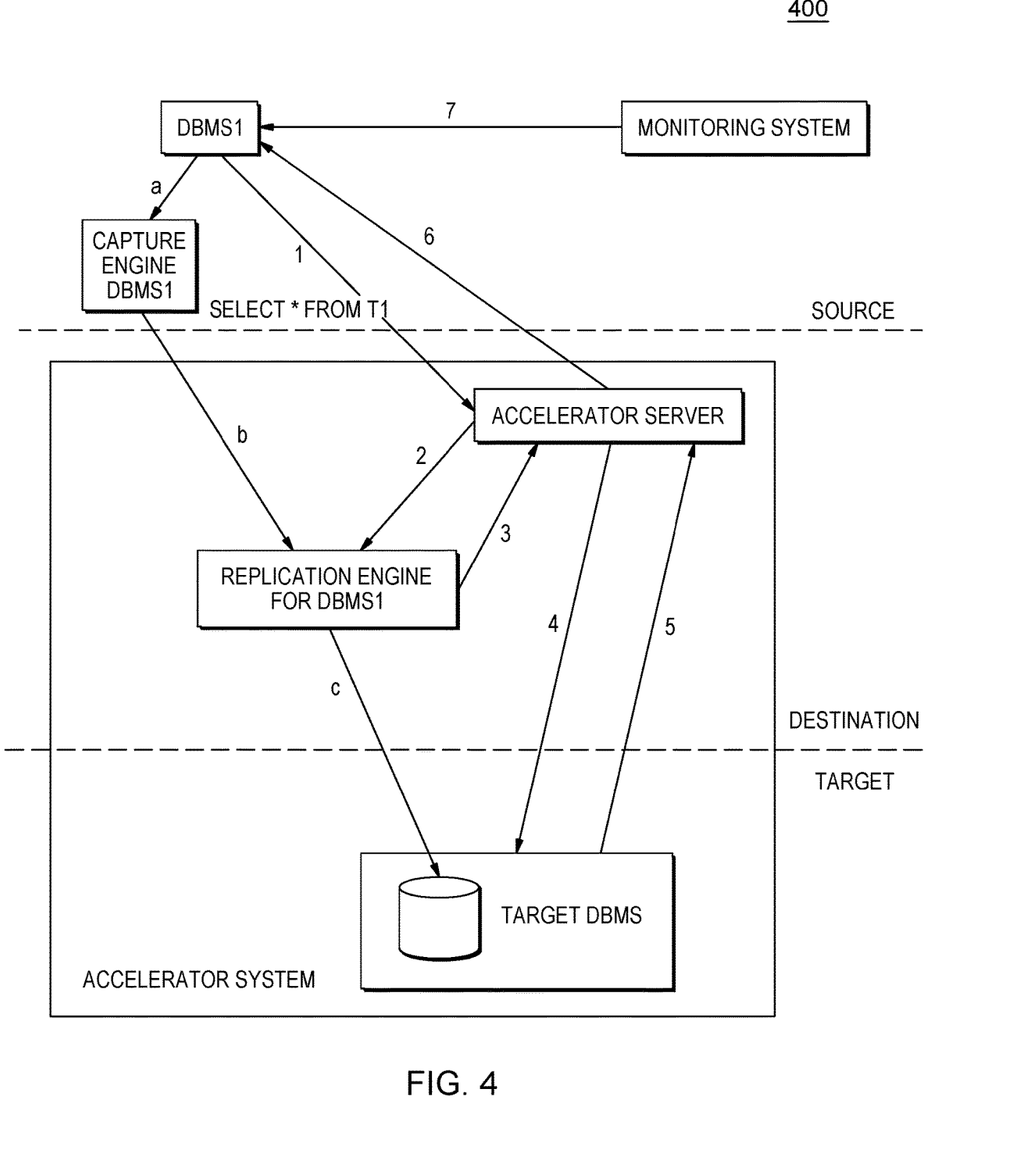
FIG. 4 is a block diagram of a second embodiment of a system according to the present invention.

As shown in FIG. 4, block diagram 400 relates to components and operations involved in fetching data with consideration of staleness according to an embodiment of the present invention. In diagram 400, the arrows are labelled with alphanumeric characters to show the order of operations performed. More specifically, block diagram illustrates seven (7) operations respectively discussed in the following seven (7) paragraphs.

OPERATION 1: Select * from T1 (Time stamp 1-$TS_{target1}$). TS1 is log position or timestamp in DBMS1 at time when Q1 comes in.

OPERATION 2: Accelerator Server sends T1 information (Table ID), $TS_{target1}$ to Replication Engine.

OPERATION 3: When the replication engine responds it sends the staleness information ($TS_{target1}$-$TS_{replication}$) based on the timestamp of data it currently has replicated ($TS_{replication}$).

OPERATION 4: Query target DBMS.

OPERATION 5: Return data from target.

OPERATION 6: Return data to source along with the staleness information.

OPERATION 7: Monitoring system fetches the information from the DBMS for display. Note that a, b and c indicate the data replication process from source to target and the (data) capture engine while the replication engine orchestrates the process.

The scenario of block diagram 400 represents the flow to detect data staleness when the query executes in target DBMS from a single source DBMS. There would be similar flow when expanded to use cases where multiple target DBMS' work with the source DBMS. The trigger is a query like select * from T1, where T1 is a table on the source DBMS that has been loaded into the accelerator or column store structure to enable acceleration for queries against table T1. The source DBMS then passes control to the accelerator server to accelerate the query; as a result, the accelerator server receives the query request and the latest modification timestamp for tables in the query TStarget1.

Before the query is executed in target DBMS, the accelerator server sends details of the table, including Table ID and modification timestamp $TS_{target1}$, to the replication engine to calculate the staleness of the data being queried. The replication engine will then compare the modification timestamp TStarget1 against its internal replication timestamp ($TS_{replication}$) to find the staleness and report back to the accelerator server. Upon receiving response from the replication engine, the accelerator server immediately executes the query in target DBMS and then transmit the query result and staleness information back to the source DBMS. As soon as source DBMS receives the response from the accelerator server, this staleness information becomes available for the monitoring system to consume.

The scenario as described by block diagram 400 can be further extended to consider multiple accelerator systems where data is replicated and duplicated to each of the accelerator systems for the purpose of workload balance and redundancy. A "workload balance algorithm" can be described as any algorithm that governs which accelerator system an eligible query is sent to. Versions of a workload balance algorithm include a simple round robin and an algorithm based on response time. There are other possible workload balance algorithms (now known or to be developed in the future) that may be used in connection with various embodiments of the present invention. Staleness information can be used as another factor in influencing the workload balance algorithm. When the source DBMS executes queries to each of the accelerator systems, each accelerator systems also returns staleness information to the source DBMS. This information can be aggregated per accelerator systems and the monitoring system using this to influence the workload balance algorithm of the source DBMS.

Figure 5:
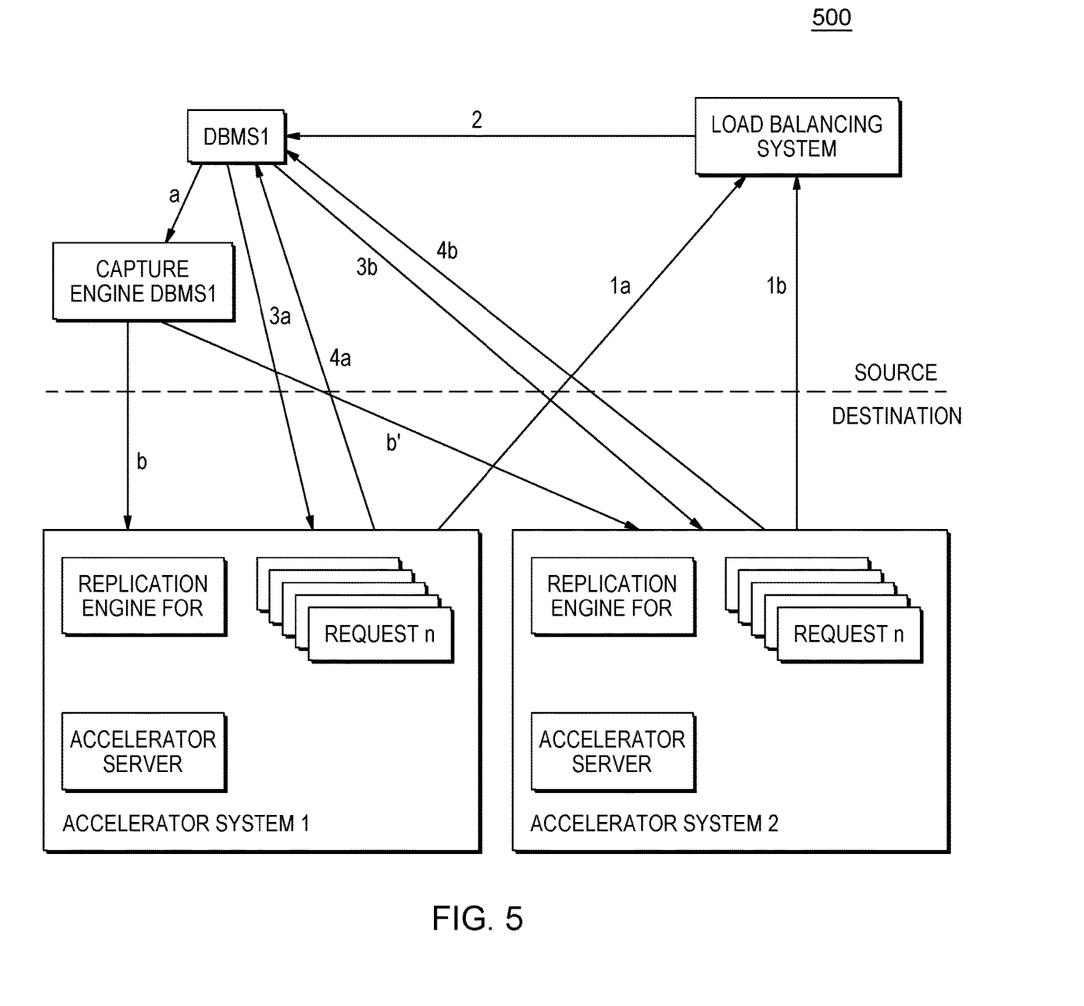
FIG. 5 is a block diagram of a third embodiment of a system according to the present invention.

As shown in FIG. 5, block diagram 500 shows a system that considers fetching staleness when routing queries. In diagram 500, the arrows are labelled with alphanumeric characters to show the order of operations performed. The system of block diagram 500 represents the current workload balancing method based on queue length. Every connected target DBMS sends queue length to the load Balancer component on a set time interval. The load balancer system can be internal or external to the source DBMS engine. The load balancing component reports this information to the source DBMS to help route the query based on capacity and queue length of each of the accelerators or target DBMS systems. Then the query is routed to a certain target DBMS and post execution, results are returned to the source DBMS. This system of workload balancing does not account for stale data and the chances that a query executes on stale data is high.

Figure 6:
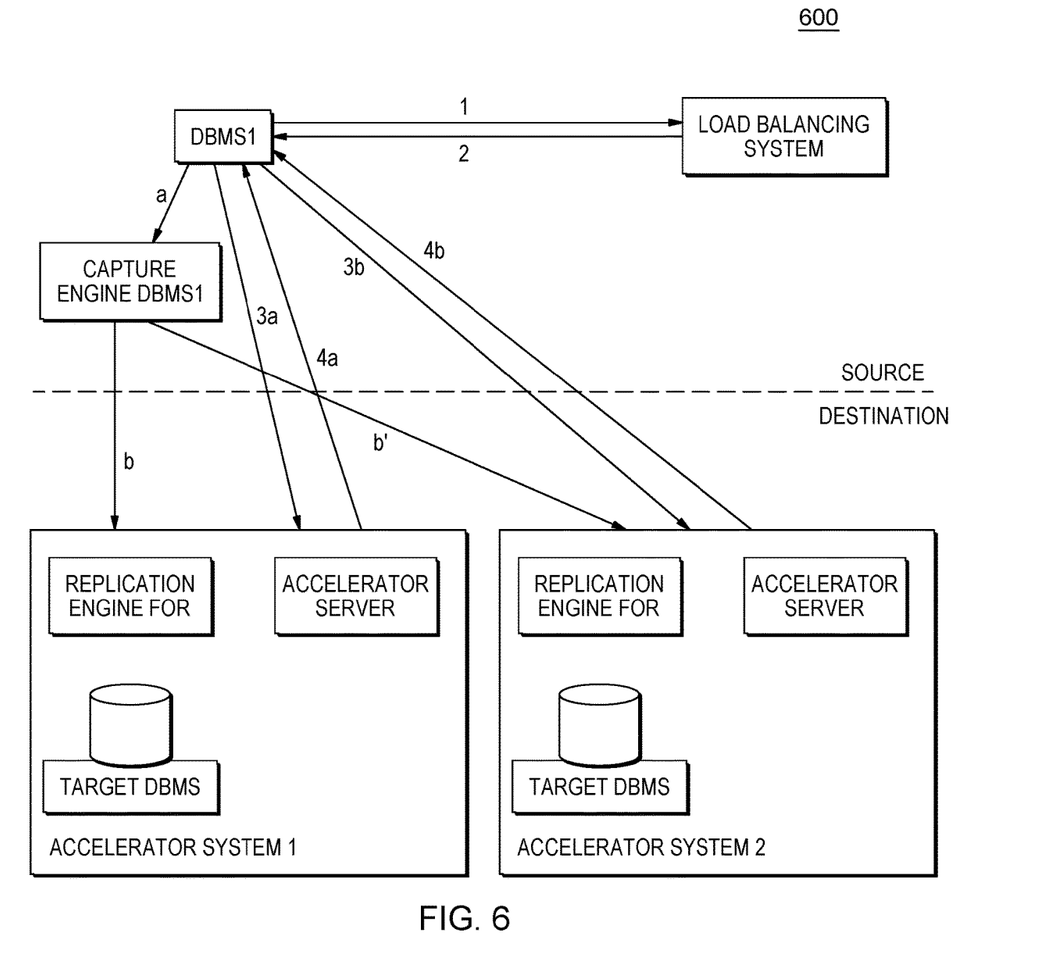
FIG. 6 is a block diagram of a fourth embodiment of a system according to the present invention.

As shown in block diagram 600 of FIG. 6, in some embodiments, the staleness parameter is used in workload balancing. In diagram 600, the arrows are labelled with alphanumeric characters to show the order of operations performed. The load balancing system first fetches the data replication latency for all connected target DBMS' from the source DBMS. The calculation of latency is illustrated in FIG. 4. "Data replication latency" refers to the time delay in replicating data between a source DBMS and a target DBMS. For example, a latency of 2 seconds means, updates on the target are 2 seconds behind updates to the source, meaning that the relevant data may not the same as between the source and target.

That latency numbers already implicitly reflects the each of the processing, I/O, network loads and capacities of the accelerators and suitable as a measure for workload balancing. A system with a higher latency number is likely to execute queries slower than a system with lower latency number. If a system experiences a partial failure on one of its components resulting in lower capacity, the latency will reflect that soon as queries are being executed.

In some embodiments, each accelerator is primed with an initial 0 latency and query is routed to each accelerator in a round robin fashion. As queries returns from the accelerators with the latency values, the load balancer returns the routing decision based on the accelerators or target DBMS' with the least or lowest latency. With the routing decision made, the query is then routed to the right target DBMS from the source DBMS. This method ensures that in a replication enabled system, the queries are always executed on current, or least stale, data and most likely on a system with the lowest load which also benefits queries on non-replicated data.

Some embodiments can also be used in conjunction with WAITFORDATA. In WAITFORDATA, the source DBMS sets the time that represents how long the accelerator should wait for committed data from source DBMS to be replicated to the accelerator. If that time expires before committed data is replicated, the accelerator will return an error code for the query. With staleness information sent back to the source DBMS for every query, the source DBMS can actually determine whether an accelerator has small enough latency to run queries with specified WAITFORDATA value and only sends the query to accelerator that has the lowest staleness value. On systems enabled for replication, there is also a pre-established concept of replication velocity. Replication velocity is the rate at which data can be updated in an update to the database, typically measured in the measurement unit of unit of rows/second. A value less than 1 indicates that latency will increase and a value greater than 1 indicates that latency will reduce.

As a variation to the above described approach the staleness information can be combined with the replication velocity to distribute workloads for queries that reference data from replicated tables. The staleness value combined with the velocity can indicate if the WAITFORDATA specified with the query is reasonably enough time for the replication to catch up and provide the result to the query. For example, if staleness is 50 seconds and velocity is 10, then within 5 seconds, replication is likely to catch up. If this metric (calculated as mentioned before) for all accelerators is higher than WAITFORDATA timeout, the source DBMS can immediately fail the query without actually waiting for the WAITFORDATA period to expire.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Set of thing(s): does not include the null set; "set of thing(s)" means that there exist at least one of the thing, and possibly more; for example, a set of computer(s) means at least one computer and possibly more.

Virtualized computing environments (VCEs): VCEs can be stored as "images." A new active instance of the VCE can be instantiated from the image. Two types of VCEs are virtual machines and containers. A container is a VCE that uses operating-system-level virtualization. This refers to an operating system feature in which the kernel allows the existence of multiple isolated user-space instances, called containers. This isolated user-space instances may look like real computers from the point of view of programs running in them. A computer program running on an ordinary operating system can see all resources (connected devices, files and folders, network shares, CPU power, quantifiable hardware capabilities) of that computer. However, programs running inside a container can only see the container's contents and devices assigned to the container.

Cloud computing system: a computer system that is distributed over the geographical range of a communication network(s), where the computing work and/or computing resources on the server side are primarily (or entirely) implemented by VCEs (see definition of VCEs in previous paragraph). Cloud computing systems typically include a cloud orchestration module, layer and/or program that manages and controls the VCEs on the server side with respect to instantiations, configurations, movements between physical host devices, terminations of previously active VCEs and the like.

What is claimed is:

1. A computer-implemented method (CIM) for distributing query response workload in an online processing system including a plurality of accelerators, with each accelerator including a workload balance module and a plurality of online processing sub-systems and with each online processing subsystem respectively including a database management module, a replicated version of a database and a server configured to respond to queries, the CIM comprising:
    for each online processing sub-system of the plurality of online processing systems, receiving a current performance characteristics data set including at least: (i) an update latency value indicative of a latency time associated with the given online processing sub-system occurring during intermittent database replication updates, and (ii) an update replication velocity value indicative of a speed at which the given online processing system receives data during intermittent database replication updates;
    during each intermittent database replication update, replicating update information to each accelerator of the plurality of accelerators;
    adjusting each workload balance module of each accelerator based on the update information;
    subsequent to the adjusting of each workload balance module, receiving, by a first workload balance module of a first accelerator of the plurality of accelerators, a query requesting selected information from the database; and
    selecting, by machine logic of the first workload balance module, a target online processing sub-system for responding to the query based on the current performance data sets of the plurality of online processing sub-systems, with the selection of the target online processing sub-system including consideration of at least the update latency values and the update replication velocity values.

* * * * *